July 29, 1930.    E. J. WENDELL    1,771,975
RELIEF VALVE FOR PUMPS
Filed Sept. 24, 1927
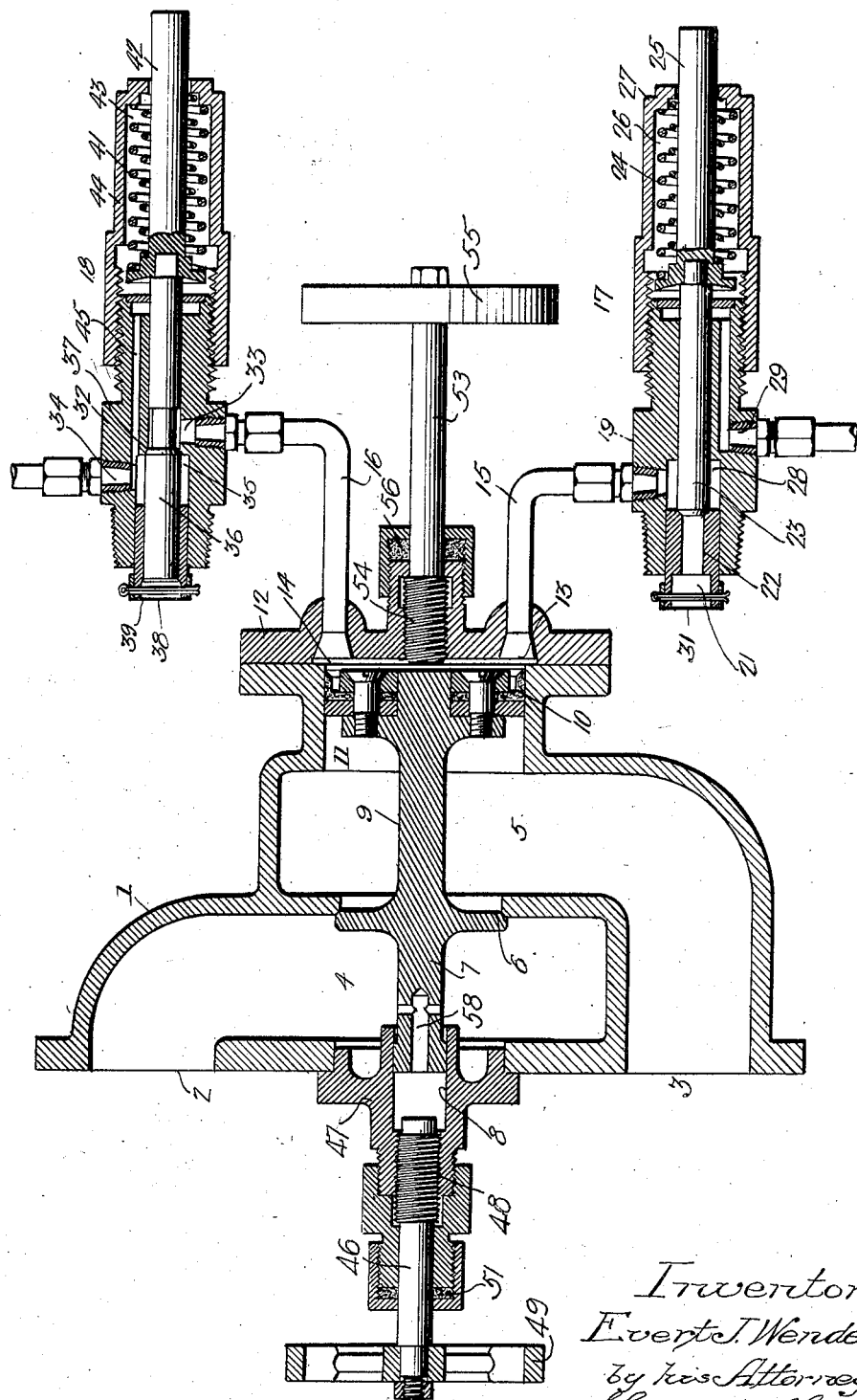
Inventor:-
Everet J. Wendell,
by his Attorneys
Howson & Howson Patented July 29, 1930

1,771,975

UNITED STATES PATENT OFFICE

EVERT J. WENDELL, OF WAYNE, PENNSYLVANIA

RELIEF VALVE FOR PUMPS

Application filed September 24, 1927. Serial No. 221,774.

This invention relates to improvements in relief valves for pumps, and while not limited in application is particularly useful in connection with rotary gear pumps of the type used in fire apparatus.

The principal object of the invention is to provide a pressure relief valve which shall be smooth and efficient in operation and which shall prevent, by novel valve-controlling means, the uncontrolled oscillation of the valve which under certain pressure conditions is a common fault of relief valves of this general character.

Another object of the invention is to provide a relief valve so constructed that the position of the valve is accurately determined by the amount of excess pressure which it is the function of the valve to relieve.

The invention further resides in certain novel structural features and arrangements of parts hereinafter set forth and illustrated in the attached drawing, which gives in more or less diagrammatic form a sectional view of a preferred embodiment of my invention.

With reference to the drawing, the device comprises a casing 1 adapted to be secured to the casing of the pump with which the device is to be used and having ports 2 and 3 to be connected respectively to the discharge and suction sides of the said pump. Connected with the port 2, is a chamber 4 which is normally separated from a chamber 5, with which the port 3 communicates, by a valve 6 movably mounted in the casing. The valve 6 includes a stem 7 which slides in a guide 8 in the casing, and at the opposite side a stem 9 terminating in a piston 10 which operates in a cylinder 11 in the casing extending from the chamber 5. It will be noted that the piston 10 is greater in diameter than the valve 6.

The outer end of the cylinder 11 is closed by a head 12 having therein ports 13 and 14 which communicate through pipes 15 and 16 with pilot valves 17 and 18 respectively. The valve 17 comprises a casing 19 having at one end a port 21 and also at this end a bushing 22 which constitutes a seat for a plunger valve 23 slidably mounted in the casing. The valve 23 is normally held to its seat by a spring or springs 24 operating through a second plunger 25 mounted in a chamber 26 at the outer end of the valve formed by a casing part 27 threaded on the casing 19, as clearly illustrated. The spring 24 is confined between the head of the plunger 25 and the outer end of the casing part 27 so that the pressure of the spring tending to close the valve 23 may be regulated by turning the part 27 in the proper direction on the casing 19. The port 21 when the valve 23 is open is in communication with a chamber 28 in the casing, from which chamber extends the pipe 15, so that in the present instance when the valve 23 is open, an unobstructed passage is provided between the port 21 and the port 13 in the head 12 and the outer end of the cylinder 11. In operation, the port 21 of the valve 17 is connected to the pressure or discharge side of the pump so that the outer face of the valve 23 is continuously subjected to pump pressure. The casing 17 also includes a port 29, from which any leakage of liquid past the plunger 23 may pass to the drain. A screen 31 is provided across the port 21 to exclude from the valve any solid or foreign material that might interfere with the proper seating of the valve 23 or disturb the normal operation of the valve.

The valve 18 comprises a casing 32 having an intake port 33 and a discharge port 34, both communicating with a chamber 35. A plunger valve 36 operates in the casing and normally seats at 37, thereby shutting off the intake port 33 from the chamber 35 and from the discharge port 34. The casing also includes a port 38 which is closed by the outer end of the plunger 36, and this port 38 is normally connected with the discharge or pressure side of the pump so that the said outer end of the plunger 36 is continuously subjected to pump pressure which tends to hold the valve to its seat. In this instance also, a suitable screen 39 is provided over the port 38 to exclude foreign material from the pump casing. Acting upon the plunger 36 in opposition to the pump pressure is a spring or springs 41 which act upon the outer end of the valve through a medium of a second plunger 42, the springs and the last-named plunger being mounted in a chamber 43 formed by a casing part 44 threaded on an extension of the casing 32, as clearly illustrated. Obviously the pressure of the springs upon the plunger 36 may be varied by adjusting the casing part 44 upon the casing 32. Provision is also made through a passage 45 for bypassing any leakage of liquid past the plunger 36 to the discharge port 34, which is connected with the drain. The intake port 33 is connected through the pipe 16 with the port 14 in the cylinder head 12 and with the outer end of the cylinder.

Under certain conditions, it is desirable to provide positive means for holding the valve 6 to its seat. I accordingly provide a stem or shaft 46 mounted in a casing extension 47 in alignment with and at the end of the valve stem 7. The shaft 46 is threaded into the casing, as indicated at 48, and on the outer end of the shaft which projects beyond the casing I provide a hand wheel 49 by means of which the shaft may be turned inwardly against the outer end of the stem 7, thereby to hold the valve 6 positively to its seat. As indicated at 51, the stem 46 is suitably packed to prevent leakage. Also in order to prevent the trapping of liquid in the space between the outer end of the valve stem 7 and the inner end of the shaft 46, I provide in the said stem 7 passages 58 which extend from the outer end of the stem to the sides thereof within the chamber 4.

Under certain circumstances also well understood by those acquainted with the art, it may be desirable to hold the valve 6 open by positive and manually adjustable means. I accordingly provide in the cylinder head 12 means for supporting a shaft 53, this shaft being threaded in the head as indicated at 54 and being adapted to be turned in through the medium of a hand wheel 55 on the outer projecting end of the shaft against the outer face of the piston 10 to thereby force the latter inwardly and the valve 6 from its seat. Suitable packing means is provided at 56 to prevent leakage from the cylinder 11 past the shaft 53.

In operation, the pressures of the springs 24 and 41 are adjusted to approximately the maximum pressure at which it is desired to operate the pump. In the normal operation therefore, as soon as the pressure in the pump increases to a point above the normal operating pressure, the valve 23 will be forced open, thereby permitting application of pump pressure through the pipe 15 to the outer face of the piston 10. At this point, it will be noted that the pump pressure is also acting against the plunger 36 of the valve 32 to retain this valve in the normal closed position, as illustrated, so that the port 33 and accordingly the port 14 in the cylinder head 12 is effectively closed. The outer face of the valve 6 is also subjected to pump pressure, but the piston 10 being of greater area than the valve 6, the pressure applied through the port 13 as described will cause a movement of the piston in the cylinder and the opening of the valve 6. This movement continues until the opening of the valve 6 provides a bypass between the discharge and suction sides of the pump through the chambers 4 and 5 sufficient to relieve the abnormal pressure, at which point the valve 23 again closes, and so long as the conditions which cause this abnormal pressure exist, the valve 6 will remain open just sufficiently far to relieve the pressure, the operation of the pump remaining otherwise at normal. If from any cause the pump pressure again exceeds normal, the valve 23 will again open and cause a further movement of the piston 10 and a consequent further opening of the valve 6 until the pressure decrease allows the valve 23 to close, at which point the movement of the piston stops, the valve 6 then being open just sufficiently far to relieve the abnormal pressure.

If the pressure falls below normal, the pilot valve 32 comes into play. By reason of the falling pressure on the outer end of the valve 36, the spring 41 opens the valve 36, thereby providing a direct passage between the ports 33 and 34, and a direct line of discharge from the outer end of the cylinder 11 to the drain. The pressure on the outer face of the piston being thus reduced, the pump pressure acting on the inner face of the piston forces the piston inwardly until the valve 6 is closed or until the amount of the bypassed fluid is such as to bring the pressure of the pump to normal. At this point, the valve 36 will close, thereby closing the discharge port of the cylinder 11, and the parts will then remain stationary until a further pressure change develops.

By this arrangement and by use of the two pilot valves as described above, I have entirely eliminated vibration of the valve 6 and have provided a relief device which is smooth and entirely efficient in operation.

In order to assist the operator in setting the apparatus for any predetermined desirable pump pressure, the relatively moving parts of the pilot valves may be calibrated to indicate the pressures of the springs 24 and 41 for any given position of the casing parts 27 or 44 with respect to the casings proper. Where, as in certain types of operation, it is essential that the valve 6 be tightly closed, this can be accomplished manually by means of the lock wheel 49, and the valve 6 may be positively opened and held in the open position when desired by means of the hand wheel 55.

I claim:

1. In a device for automatically maintaining a constant pressure difference between two points of a pressure fluid conduit, the combination with a duct adapted to constitute a bypass between said points, of a valve controlling said bypass, a working cylinder, a piston in said cylinder operatively connected with said valve, said cylinder having one end connected with the intake side of said bypass duct, intake and discharge ports for the other end of said cylinder, means for connecting the intake port with the intake side of said bypass duct, a valve normally closing said intake port and adapted to open automatically when the pressure in the intake side of said duct increases beyond a predetermined point, a valve normally closing the discharge port of said cylinder and operatively connected with the intake side of the bypass duct whereby the valve is normally held closed by pressure in said duct, and means whereby the latter valve is automatically opened when the pressure in the bypass falls below a predetermined point.

2. In a device for automatically maintaining a constant pressure difference between two points of a pressure fluid conduit, the combination with a duct adapted to constitute a bypass between said points, a valve controlling said duct, and means including a pair of pilot valves individually operatively connected with the intake end of said duct for actuating the valve automatically to maintain a predetermined pressure at the intake end of said duct.

3. In a device for automatically maintaining a constant pressure difference between two points of a pressure fluid conduit, the combination with a duct adapted to constitute a bypass between said points, of a valve controlling said duct, a cylinder, a piston within said cylinder operatively connected with the valve and arranged so that one side of the piston is subjected to the pressure of the intake end of said bypass when said valve is opened, means for subjecting the opposite side of the piston to the pressure in the intake end of said duct including a control valve adapted to open only when the said pressure exceeds a predetermined normal, and means for relieving the pressure in the cylinder to permit the piston to move in a valve-closing direction including a valve operatively connected with the intake side of the duct so as to be closed when the pressure in the said intake is at or greater than the normal and adapted to automatically open when the pressure decreases below the normal.

4. In a device for automatically maintaining a constant pressure difference between two points of a pressure fluid conduit, the combination with a pair of chambers adapted respectively to be connected to said points, a port connecting said chambers, and a valve operating in the chamber connected to the said point of higher pressure and adapted normally to close said port, a cylinder extending from the chamber connected to the point of lower pressure, a piston in said cylinder connected with the valve, intake and discharge ports in the outer end of said cylinder, means connecting the intake port with the chamber of higher pressure and the discharge port with an exhaust, and a plurality of valves controlled by the pressure at the said point of higher pressure and controlling themselves the opening and closing of said intake and discharge ports.

5. In a device for automatically maintaining a constant pressure difference between two points of a pressure fluid conduit, the combination with a duct adapted to constitute a bypass between said points, of a valve adapted to close said duct, and means for actuating the valve to control the relative pressures at the ends of said bypass including a pair of pilot valves, one of which is affected by an increase in the pressure at the point of higher pressure to cause the bypass valve to move open, and the other of which is affected by a reduction in said pressure to cause the bypass valve to move closed.

EVERT J. WENDELL.